No. 780,217. PATENTED JAN. 17, 1905.
W. McCLOSKEY.
CULTIVATOR.
APPLICATION FILED APR. 28, 1904.
2 SHEETS—SHEET 1.
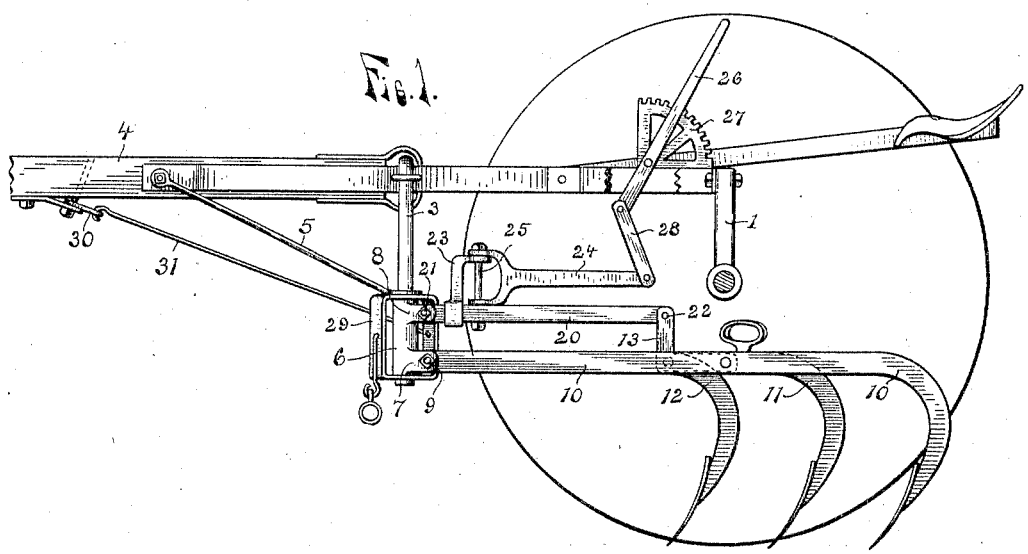
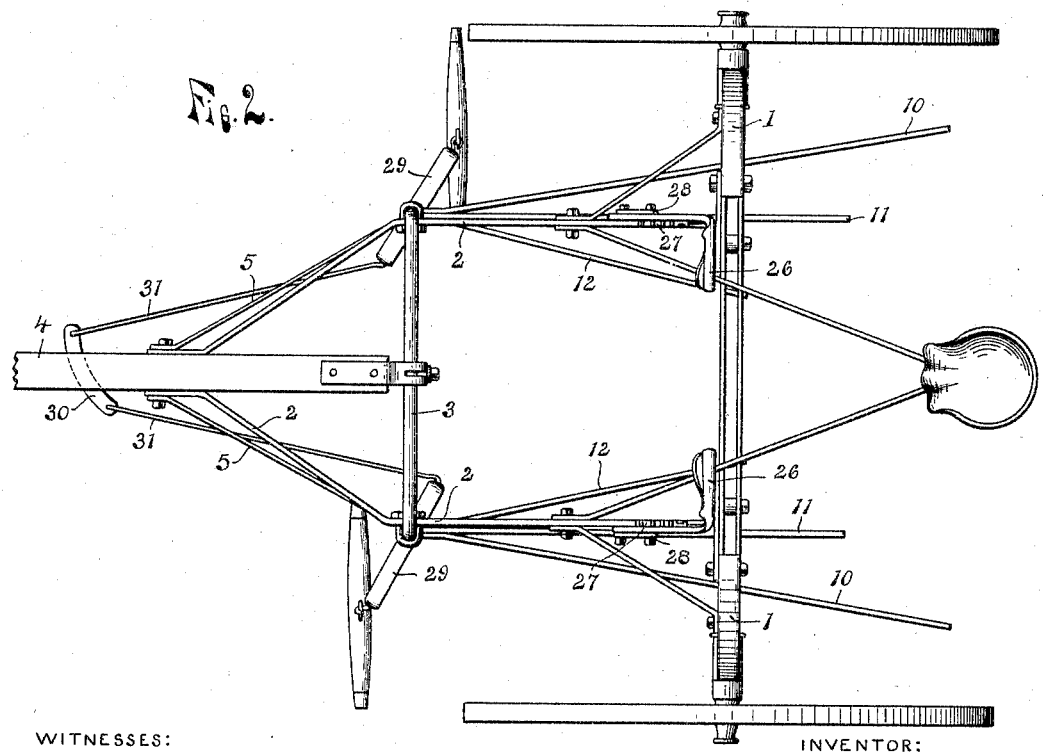
WITNESSES:
M. E. Scully
B. Scully
INVENTOR:
William McCloskey
By E. J. Scully
Attorney

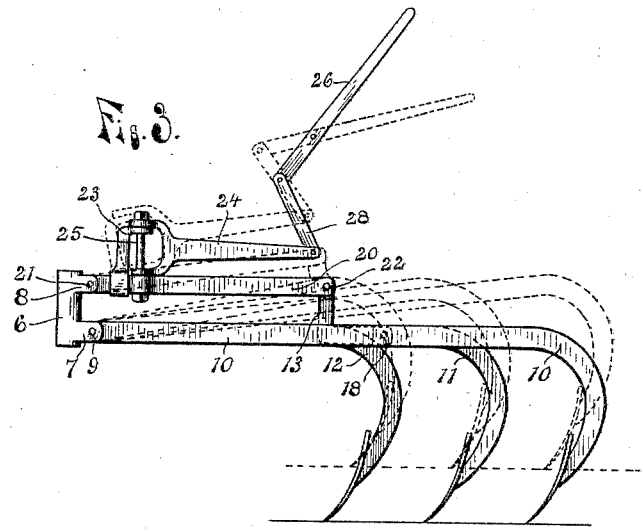
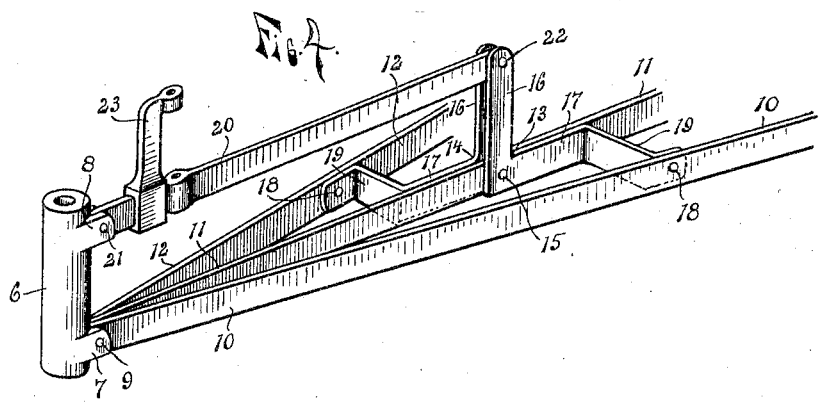
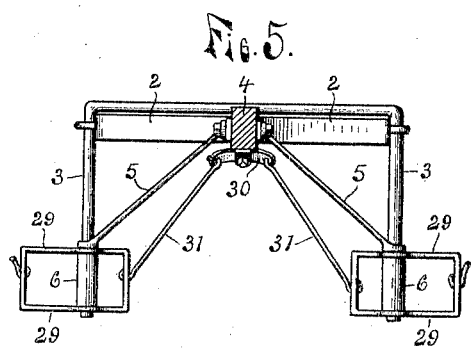

No. 780,217.

Patented January 17, 1905.

UNITED STATES PATENT OFFICE.

WILLIAM McCLOSKEY, OF ESSEX, CANADA, ASSIGNOR OF ONE-HALF TO EDMUND I. SCULLY, OF WINDSOR, ONTARIO, CANADA.

CULTIVATOR.

SPECIFICATION forming part of Letters Patent No. 780,217, dated January 17, 1905.

Application filed April 28, 1904. Serial No. 205,331.

*To all whom it may concern:*

Be it known that I, WILLIAM McCLOSKEY, a citizen of Canada, residing at Essex, in the county of Essex and Province of Ontario, Canada, have invented certain new and useful Improvements in Cultivators, of which the following is a specification.

This invention relates to improvements in cultivators, and especially to that class known as "sulky-cultivators" in which the shovels or teeth are arranged in independent gangs, so attached to the cultivator-frame as to be movable both laterally and vertically.

The object of the invention is to provide a simple, cheap, and durable construction in which the teeth of each gang are so arranged that when the gang is raised or lowered the lower working points of the teeth will all lie in the same horizontal plane no matter to what position they are adjusted either vertically or laterally.

It is also an object of the invention to provide means for raising and lowering each gang so attached thereto as not to hinder the lateral movement thereof; and a further object is to provide suitable draft mechanism especially adapted for cultivators of this class and to provide certain other new and useful features, all as hereinafter more fully described, reference being had to the accompanying drawings, in which—

Figure 1 is a side elevation of a device embodying the invention; Fig. 2, a plan view of the same; Fig. 3, a detail showing a side elevation of one of the gangs and showing in dotted lines the position of the parts when the gang is raised. Fig. 4 is a perspective detail of one of the gangs; and Fig. 5 is a detail of the draft mechanism, showing the same in front elevation.

As shown in the drawings, 1 is the arched axle provided with the ordinary supporting-wheels, and bolted to the forward side of said axle are the side bars 2 of the supporting-frame of the cultivator, which extend forward therefrom past the draft-yoke 3, to which they are attached by suitable clips and converging are secured by a bolt to the tongue 4, the rear end of which is adjustably secured to the draft-yoke. Brace-rods 5 are secured at one end to the tongue and at their opposite ends are provided with eyes to receive the vertically-extending ends of the draft-yoke. On the lower ends of the draft-yoke, below the brace-rods, are sleeved the tubular castings 6, free to turn thereon and provided with rearwardly-extending ears 7 and 8. Pivotally secured between the ears 7 of each sleeve or casting by a bolt passing through said ears are the forward ends of the shovel-bars 10, 11, and 12, which diverge as they extend backward from their pivotal point of attachment to the sleeves and curving downward at their rear ends are provided with any suitable form of shovel-blades or teeth. These bars are of unequal length, the bars 10 being the longest and the bars 12 the shortest, and they form two independent gang-frames, each pivotally attached by means of the sleeve 6 to one end of the draft-yoke to move laterally and by means of their pivots 9 to rise. The bars of each gang-frame are free to turn on the pivots 9 independently of each other, and intermediate their ends the bars are connected by two bell-crank levers 13 and 14, each pivoted at 15 at the junction of their right-angle arms 16 and 17 to the middle bar 11 and at 18 at the outer ends of their laterally-extending arms 19 to the outer bars 10 and 12. The arm 17 of the bell-crank lever 13 extends rearwardly from the pivot 15, and the same arm of the bell-crank 14 extends forwardly therefrom, so that when their vertically-extending arms 16 are both rocked forward the long bar 10 will be raised and the short bar 12 will be lowered.

A connecting-bar 20 is pivotally secured at 21 at one end between the ears 8 on each sleeve 6, and at its opposite end this bar is pivotally attached to the upper ends of the arms 16 of the bell-cranks at 22 and extends parallel with the bar 11 and directly above the same, so that when the gang-frame is lowered said arms 16 will be held in a vertical position or will be rocked forward relative to the said bars, and thus the long bar 10 will be raised slightly and the short bar 12 lowered. These bell-crank levers are so proportioned relative to the length of the bars and the distance at which the levers are pivoted to the bars from the pivot 9 that these outer bars will be raised or lowered just sufficiently as the gang-frame is raised or lowered, so that the lower points of the teeth on all three of the bars will always be in a common horizontal plane and therefore when lowered will all enter the ground to the same depth.

Each gang is raised or lowered by securing a post 23 to the bar 20 and pivotally securing to the upper rearwardly-extending end of said post and the bar the forked end of a lever 24 by providing openings in the bar, lever, and post to receive a bolt 25. Pivoted in the supporting-frame of the cultivator is an ordinary form of hand-lever 26, having a latch to engage a sector 27, and pivotally secured to the lower end of this hand-lever, which is extended beyond its pivot, is a link 28, the opposite end of which link is pivotally attached to the rear end of the lever 24. By moving the hand-levers the gang-frames may be raised or lowered, as desired, and the latches and sectors will hold the same in the position to which they are adjusted, and by pivoting the levers 24 near the pivots of the gang-frames said frames may be swung laterally by the operator very easily, as said levers do not interfere with such movement.

Pivoted upon the lower ends of the draft-yoke are the rectangular frames 29, each being provided with openings intermediate their ends through which the ends of the yoke are passed, with the sleeves 6 between the sides of the frame. Pivotally secured to the under side of the tongue at a point ahead of the side bars 2 is a short curved draft bar or evener 30, provided with an opening near each end into which hooks on the ends of rods 31 are engaged, hooks on the opposite ends of said rods engaging openings in the vertical bars of the inner ends of the frames 29. The vertical bars of the outer ends of the frames are provided with holes for the engagement of hooks to which the whiffletrees are attached. The frames 29 turn freely upon the draft-yoke, and by means of the rods and evener the frames are so connected that a movement similar to that obtained by the use of the ordinary evener is secured without obstructing the path between the gang-frames.

Having thus fully described my invention, what I claim as my invention, and desire to secure by Letters Patent, is—

1. In a cultivator, the combination with the supporting-frame, of shovel-bars of unequal length arranged in gangs, the bars of each gang being pivoted at their forward ends and free to rise and fall at their rear ends independently of each other, and means connecting the bars of each gang whereby the bars are relatively moved as the gang is raised or lowered to maintain the working ends of said bars in a common horizontal plane.

2. In a cultivator, the combination with the supporting-frame, of shovel-bars of unequal length arranged in gangs, the bars of each gang being pivoted at their forward ends to the frame and free to rise and fall at their rear ends independently of each other, blades on the rear ends of said bars, a bar pivoted to the frame and extending parallel with the shovel-bars and above the same, means pivotally attached to the rear end of said bar and to the shovel-bar of each gang to move the shovel-bars relative to each other to maintain the blades in a common horizontal plane when the gang is raised or lowered.

3. In a cultivator, the combination with the supporting-frame, of shovel-bars of unequal length arranged in gangs, the bars of each gang being pivoted at their forward ends to the frames and free to rise and fall at their rear ends independently of each other, bell-crank levers pivoted to said bars to move the same relative to each other, and means pivoted to the upwardly-extending arms of the bell-cranks to operate the same when the gangs are raised or lowered.

4. In a cultivator, the combination with the supporting-frame, of gang-frames pivotally connected at their forward ends to the frame and free to rise and fall, vertically-extending arms on said frames, bars pivoted at one end to the frames and at their opposite ends to said arms and extending parallel with and above the gang-frames, and means for raising and lowering said gang-frames.

5. In a cultivator, the combination with the supporting-frame, of shovel-bars of unequal length arranged in gangs of three, the bars of each gang being pivoted at their forward ends to the frame and free to rise and fall at their rear ends independently of each other, blades on the rear ends of said bars, a bar pivoted to the frame at its forward end and extending rearwardly parallel with the shovel-bars above the same, bell-crank levers pivoted at the junction of their right-angle arms to the intermediate bar of each gang with the horizontal-extending arms of one bell-crank extending rearwardly from its pivot and the same arm of the other bell-crank extending forwardly from its pivot, a laterally-extending arm on the end of the rearwardly-extending arm pivotally secured to the long shovel-bar, and a laterally-extending arm on the forwardly-extending arm pivotally secured to the short shovel-bar, and means for raising and lowering said gangs.

6. In a cultivator, the combination with the supporting-frame, of a draft-yoke secured to said frame, sleeves on the ends of said draft-yoke free to turn thereon, gang-frames pivotally attached to said sleeves, a lever pivotally attached to each gang near its point of attachment to the sleeve, and extending rearwardly above the same, and hand-levers operatively connected with the rear ends of said levers to raise and lower the gangs.

In testimony whereof I have signed my name to this specification in presence of two witnesses.

WILLIAM McCLOSKEY.

Witnesses:
M. E. SCULLY,
B. SCULLY.